June 11, 1935.  R. F. PEO  2,004,903
HYDRAULIC SHOCK ABSORBER
Filed March 19, 1934  2 Sheets-Sheet 2
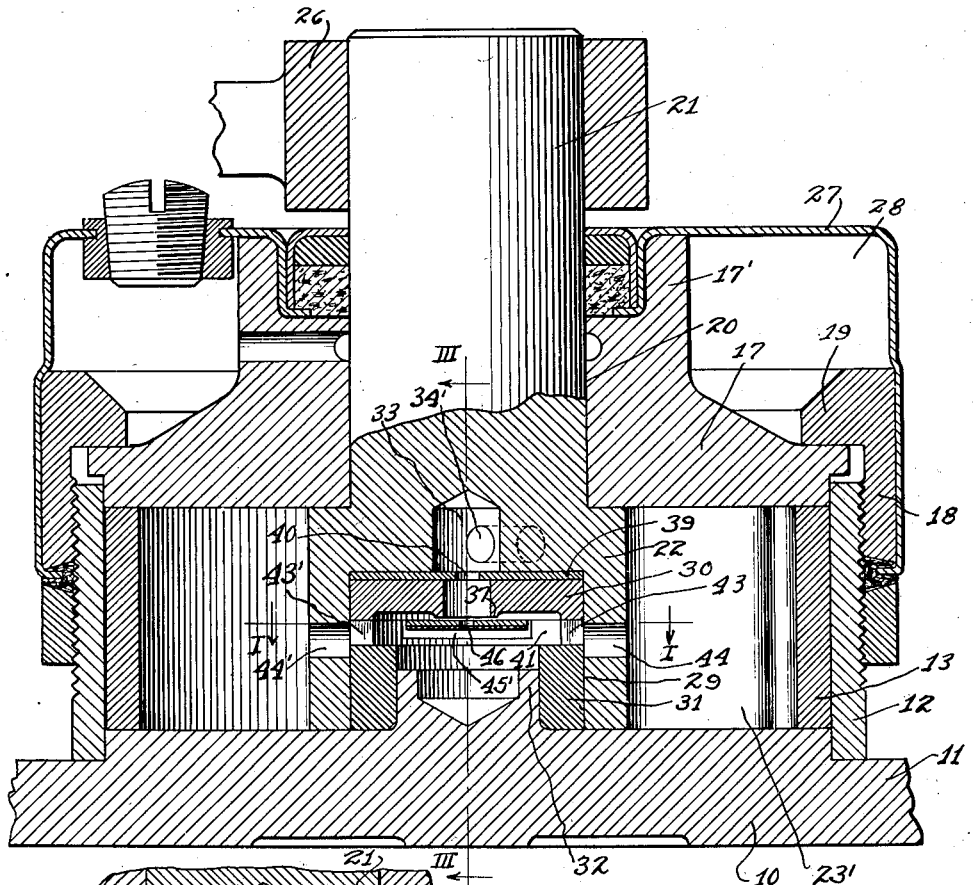
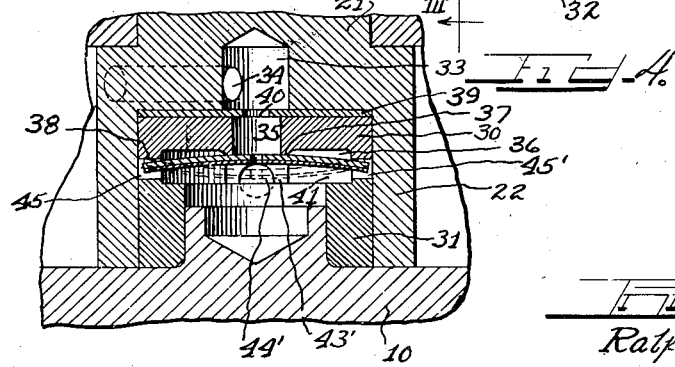
Inventor
Ralph F. Peo.
by Charles H. Hills Attys.

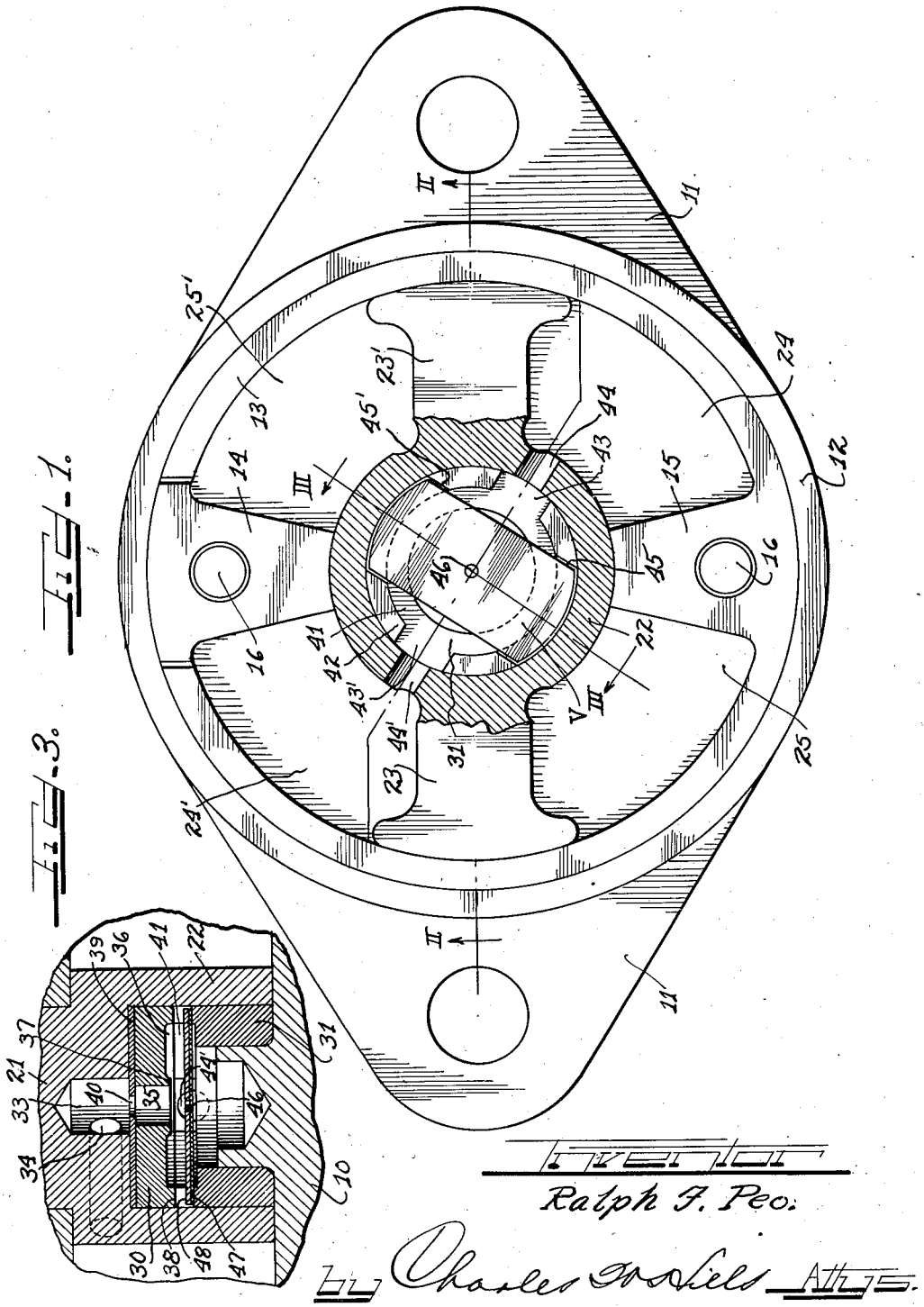

Patented June 11, 1935

2,004,903

UNITED STATES PATENT OFFICE 2,004,903

HYDRAULIC SHOCK ABSORBER

Ralph F. Peo, Buffalo, N. Y., assignor to Houde Engineering Corporation, Buffalo, N. Y., a corporation of New York Application March 19, 1934, Serial No. 716,251

13 Claims. (Cl. 188—89)

My invention relates to hydraulic shock absorbers and particularly to improved valving structure and arrangement for metering and controlling the displacement of the hydraulic fluid by the oscillation of the piston structure during travel of a vehicle.

An important object of the invention is to provide valving structure comprising a valve in the form of a floating plate provided with a restricted metering orifice, and a seat toward which the valve is moved by the fluid pressure to restrict the fluid flow to be all or in greater part through the orifice during rebound stroke of the piston structure, and to be moved by the pressure away from its seat to decrease the resistance to the flow during the bump stroke of the piston structure, the bump stroke being caused by the flexure of the vehicle spring with which the shock absorber is associated and the rebound stroke occurring during rebound of the spring.

A further object of the invention is to make the valve plate inherently thermostatic and responsive to change of temperature of the fluid so that it will buckle or distort under varying temperatures to maintain more or less clearance between itself and its seat for bypasses of fluid around the valve in addition to that flowing through its orifice, with the bypassage clearance increasing with decreasing temperature and with the bypassage clearance decreasing with increasing temperature, and shutting off of the clearance bypassage when the temperature exceeds a certain degree, the valve thus automatically compensating for variation in viscosity of the fluid.

A further object is to provide an arrangement which will effectively eliminate noise as the displaced fluid is rapidly discharged through the valve controlled passageway from one side of the piston structure to the other.

The above referred to and other features of the invention are incorporated in the structure disclosed on the drawings, in which drawings:

Figure 1 is a front view of a shock absorber with the cover structure removed and the piston structure in section on plane I—I of Figure 2;

Figure 2 is a section on plane II—II of Figure 1;

Figure 3 is a section on plane III—III of Figures 1 and 2; and

Figure 4 is a view similar to Figure 3 showing another operative position of the valve plate.

I have shown my invention applied to a rotary type of shock absorber. Briefly describing the shock absorber, it comprises a base 10 having wings 11 by which it may be secured to a support such as the chassis of an automotive vehicle. An annular wall 12 is secured to and extends from the base 10, a ring 13 fitting in the annular wall and against the base and having upper and lower partition lugs 14 and 15 extending radially inwardly therefrom, dowel pins 16 extending through the lugs and into the base for securing the ring and lugs against rotary displacement.

A cover wall 17 extends into the end of the annular wall 12 and abuts the ring 13 and the partition lugs 14 and 15 and is securely held in place by a collar 18 having threaded engagement with the outer side of the wall 12 and having the internal flange 19 abutting the wall 17. The wall 17 and its extension 17' has the bearing bore 20 for the shaft 21 extending from the cylindrical piston hub 22 between the inner sides of the wall 17 and the base 10, the piston hub having piston vanes 23 and 23' extending radially in opposite directions, the piston hub and vanes and the partition lugs dividing the cylindrical space bounded by the ring 13 into high pressure chambers 24, 24' and low pressure chambers 25 and 25', the outer faces of the vanes engaging the inner face of the ring 13 and the outer surface of the hub 22 engaging the inner surfaces of the partition lugs. A lever 26 extends from the outer end of the shaft 21 and is usually connected with the axle of an automotive vehicle so that when the vehicle is traveling the shaft 21 and the piston structure oscillate to displace the hydraulic fluid in the working chamber as the vehicle springs flex and rebound.

A shell 27 extends between the outer end of the bearing extension 17' and the wall 12 and provides a reservoir 28 for hydraulic fluid. This reservoir is connected by suitable check valves (not shown) for the flow of fluid from the reservoir to the working chambers for replenishment thereof in a manner well understood in the art.

The piston hub 22 has the cylindrical bore or pocket 29 concentric therewith in whose inner end is secured the valve seat member 30 and in whose outer end is secured the valve supporting member 31. The member 31 serves also as a bearing bushing for receiving the centering and bearing lug 32 extending inwardly from the base 10 of the shock absorber body. A bore 33 of smaller diameter continues in the hub 22 from the bore 29 and forms a chamber which is connected with the low pressure working chambers 25 and 25' by passageways 34 and 34' extending through the hub 22.

The seat member 30 has the axial passageway 35 therethrough and has the annular recess 36 in its outer face leaving the annular valve seat 37 around the passage 35 and the annular ledge or abutment face 38. A metal disc 39 is interposed between the bottom of the bore 29 and the back of the seat member 30 and this plate has the orifice 40 therethrough concentric with and interposed between the chamber 33 and the passage 35, the orifice 40 serving to meter the fluid flow from the low pressure working chambers to the high pressure working chambers.

The supporting member or annulus 31 has the cylindrical recess 41 surrounded by the flange 42, the outer face of the flange engaging the ledge 38 on the seat member 30 so that the recesses 41 and 36 form a valve chamber. The flange 42 is cut away at diametrally opposite points to leave comparatively wide passages 43 and 43' which register with passages 44 and 44' respectively through the piston hub 22 for communication with the high pressure chambers 24 and 24' respectively so that these high pressure chambers are in communication with the valve chamber.

Intermediate the passages 44 and 44' the flange 42 has the recesses 45 and 45' for receiving the ends of the valve plate V which is shown as of rectangular shape and extending diametrally across the valve chamber. The valve has a restricted orifice 46 therethrough in alignment with the chamber 35 and this orifice is preferably of the sharp edge or knife edge type so as to effect compensation for variations in viscosity of the hydraulic fluid whose flow is to be controlled. The valve plate is held against sidewise displacement by the side walls of the recesses 45 and 45' and the valve is held against lengthwise displacement by the sides of the bore 29, there being however sufficient clearance so that the valve may float freely in axial direction in the valve chamber to seat at its ends either against the bottom of the recesses 45 and 45' or against the ledge 38 of the seating member 30, depending upon the direction of fluid displacement by the piston vane. During bump stroke of the piston structure, that is during flexure of the vehicle spring, the rotation of the piston structure is in counter-clockwise direction, Figure 1. The hydraulic fluid is then forced from the low pressure chambers 25 and 25' through the passages 34 and 34' into chamber 33 and from there through the metering orifice 40 into the intermediate chamber 35 from which intermediate chamber the fluid flows against the valve plate to force it against the bottoms of the recesses 45 and 45', the fluid being then directed laterally through the valve chamber and through the passages 43 and 43' and passages 44 and 44' to the high pressure chambers 24 and 24', the flow being metered by the larger orifice 40.

During rebound strokes of the piston structure, that is when the vehicle springs recoil, the piston structure will rotate in clockwise direction to force the fluid out of the high pressure chambers through the passages 44, 44' and 43, 43' and into the valve chamber, the pressure of the fluid against the outer side of the valve plate then floating the valve with its ends against the ledge 38 of the seat member and the middle part of the plate toward the seat 37 to interpose the more restricted orifice 46 into the path of the fluid which then enters the chamber 35, and through the orifice 40 into the chamber 33 and then to the low pressure working chambers through the passages 34 and 34'.

If the face of the seat 37 is in the plane of the face of the ledge 38 the valve will immediately respond to the fluid pressure to bear against the seat 37 so that only the restricted orifice 46 is available for passage of the fluid. It may be desirable to gradually build up the shock absorber resistance against the rebound fluid flow and for this purpose the face of the seat 37 may be offset inwardly of the face of the ledge 38 as shown in Figures 2 and 3, and the valve plate made yieldable so that it may flex under pressure. With this arrangement the fluid pressure at the beginning of a rebound stroke of the piston will be insufficient to immediately force the valve plate against the seat 37 but as the pressure increases toward maximum the valve plate will be flexed and gradually brought into seating engagement with the seat 37, part of the fluid in the meantime flowing around the valve and directly into the intermediate chamber 35 and from there to the low pressure chambers, the shock absorber resistance being thus automatically built up in proportion to the increasing rebound pressure.

Under normal range of temperature the sharp edge orifices will substantially compensate for variations in temperature and viscosity of the hydraulic fluid, but in order to assure sufficient compensation during more or less abnormal temperature variations the valve plate is made inherently thermostatic so as to automatically increase or decrease the available passageway during increase or decrease of the viscosity. The valve plate is therefore bimetallic and has the two layers 47 and 48 of metals of different coefficients of expansion. In the arrangement shown the layer 47 may be of invar whose coefficient of expansion is practically negligible, while the layer 48 may be of material such as brass whose coefficient of expansion is comparatively high. With this arrangement the valve plate will buckle or flex under temperature changes. The arrangement may be such that at normal temperature, say 70° F., the plate will be flat and unbent, as shown in Figures 2 and 3 so that under ordinary pressure during rebound stroke of the piston the valve plate will not engage its offset seat 37 and will permit part of the fluid to flow around the valve and directly into the chamber 35. Should the temperature increase, the valve plate will flex or buckle to a corresponding degree to correspondingly restrict the direct or bleed passage around the valve and if the temperature increases to a certain degree then the flexure of the valve plate will be sufficient to bring it against its seat 37 so that the entire fluid flow will be through the restricted orifice 46, as shown in Figure 4. Should the temperature decrease below normal, the valve plate will buckle or flex in the opposite direction to move its middle part away from the seat 37 to correspondingly increase the direct or bleed path around the valve so that the resistance to the fluid flow will automatically decrease as the viscosity increases. Such flexure of the valve is indicated by dotted lines in Figure 4. The thermostatically operating valve may thus alone effect compensation for change in viscosity or, where the orifice 46 is of the sharp edge type, the valve and orifice will cooperate to effect the proper compensation for viscosity change so that the shock absorbing characteristics of the shock absorber will remain constant throughout a wide range of temperature and viscosity variations. This thermostatic functioning of the valve plate will not interfere with its response to fluid pressure in response to rebound pressure to flex thereunder to decrease the bypassage or bleed passage around the valve in proportion to the increasing hydraulic pressure as the vehicle spring rebounds.

It is evident that the valve plate may be of different shapes besides that shown so long as sufficient clearance is provided for bleed or bypassage flow around the valve and the valve may flex in response to temperature changes to locate itself properly relative to its seat 37 for the proper proportionate flow through the orifice 46 and the bleed passageway.

The passage or chamber 35 forms an expansion chamber between the restricted orifice 46 and the larger orfice 40 so that the high velocity stream issuing from the orifice 46 may expand and the velocity reduced before the fluid passes through the larger orifice 40. It has been found that this arrangement will effectively prevent the creation of objectionable noise.

During low resistance flow (Figure 3) the flow is metered by the orifice 40 and the valve plate which is then seated on the supporting member 31 acts to deflect the fluid laterally through the passages 43 and 43', where the fluid flows through the passages 44 and 44' into the high pressure working chambers.

I have shown practical and efficient embodiment of the various features of my invention but I do not desire to be limited to the exact construction, operation and arrangement shown and described as changes and modifications may be made without departing from the scope of the invention.

I claim as follows:

1. In a hydraulic shock absorber, a passageway for the flow of displaced hydraulic fluid, a valve chamber interposed in said passageway, a valve in the form of a plate in said valve chamber bodily movable therein, abutments for engagement by the outer portion of said valve for limiting the bodily movement thereof, means forming a seat for the inner portion of said valve and an orifice through said valve at said inner portion for inclusion in said passageway, said valve being inherently thermostatic whereby to distort under temperature change to thereby control the cooperation of the valve with said seat.

2. In a hydraulic shock absorber, a passageway for the flow of displaced hydraulic fluid, a valve chamber included in said passageway, a valve in the form of a plate movable bodily in said valve chamber in response to fluid pressure thereagainst, means forming abutments for the outer portion of said valve for limiting the bodily movement thereof, a seat member providing a seat for said valve and having an opening therethrough included in said passageway, the inner portion of said valve cooperating with said seat and having an orifice therethrough in alignment with said opening in the seat member, said valve plate being bimetallic whereby it may distort under temperature change whereby to control the cooperation of its orifice containing portion with said seat.

3. In a hydraulic shock absorber means providing a path for the flow of displaced hydraulic fluid, a valve seat member having a passageway therethrough for inclusion in said path, a valve member in the form of a plate extending across said seat member and said passageway and having an orifice therethrough for communication with said passageway, abutment means for engagement by the outer portion of said valve plate to limit the bodily movement thereof toward the passageway, said valve plate being inherently thermostatic whereby to flex under temperature change whereby to control the position of said orifice relative to said passageway.

4. In a hydraulic shock absorber, means providing a path for the flow of displaced hydraulic fluid, a valve seat member having a passageway therethrough for inclusion in said path, a valve member in the form of a plate extending across said seat member and said passageway and having an orifice therethrough for communication with said passageway, abutment means for engagement by the outer portion of said valve plate to limit the bodily movement thereof toward the passageway, said valve plate being inherently thermostatic whereby to flex under temperature change and thereby control the position of said orifice relative to said passageway and to determine the clearance between the portion of the valve plate having the orifice therein and the portion of said seat surrounding said passageway.

5. In a hydraulic shock absorber, a valving assembly for controlling the flow of displaced hydraulic fluid, said valve assembly comprising a valve housing providing a valve chamber, a valve in the form of a plate extending across said valve chamber and bodily movable therein, abutments on said valve housing for engagement by the outer portion of said valve plate for limiting the bodily movement thereof, there being a passageway through said valve housing inwardly of said abutments and opposite an inner portion of said valve plate, said inner portion of the valve plate having an orifice therethrough in alignment with said passageway, said valve plate being a bimetallic structure whereby it may be flexed by temperature changes and thereby determine the position of its orifice containing part relative to said passage after engagement of the outer portion of the valve plate with said abutment.

6. In a hydraulic shock absorber, means providing a path for the flow of displaced hydraulic fluid, a valve seat having a passageway therethrough for inclusion in said path, a valve plate adapted to abut at its outer portion against said seat to bridge said passageway and having a metering orifice at an inner portion thereof for registering with said passageway, the abutment of the outer portion of said valve plate with said seat normally holding the orifice retaining portion a distance away from said seat for flow of fluid directly to said passageway independently of said orifice, said valve being constructed of heat responsive material for causing deflection of said valve in response to temperature change whereby to automatically adjust the distance of the orifice retaining portion thereof from said seat and to thereby control the direct flow of fluid to said passageway.

7. In a hydraulic shock absorber, means providing a path for the flow of displaced hydraulic fluid, a valve seat having a passageway therethrough for inclusion in said path, a valve plate adapted to abut at its outer portion against said seat to bridge said passageway and having a metering orifice at an inner portion thereof for registering with said passageway, the abutment of the outer portion of said valve plate with said seat normally holding the orifice retaining portion a distance away from said seat for flow of fluid directly to said passageway independently of said orifice, said valve being constructed of heat responsive material for causing deflection of said valve in response to temperature change whereby to automatically adjust the distance of the orifice retaining portion thereof from said seat and to thereby control the direct flow of fluid to said passageway, a predetermined increase in temperature causing sufficient deflection of the valve plate to close said passageway to direct fluid flow and restricting the flow to said orifice.

8. In a hydraulic shock absorber, means providing a path for the flow of displaced hydraulic fluid, a seat member having a passageway therethrough for inclusion in said path, a floating valve having a metering orifice therethrough in alignment with said passageway, said valve being thermostatically responsive to engage said seat member to prevent flow through said passageway and path except by way of said orifice during a predetermined temperature and to displace itself from said seat under decreasing temperature to provide corresponding bleed flow around said valve in addition to the flow through said orifice.

9. In a hydraulic shock absorber, valving means for controlling the flow of displaced hydraulic fluid, valving means comprising a seat having a passageway therethrough, a valve in the form of a plate supported at one side of said seat and having an inner portion thereof bridging said passageway and provided with a metering orifice, fluid pressure against said valve tending to force it against said seat, said valve plate being constructed of temperature responsive material which will cause buckling of the plate in response to decrease in temperature and in a direction to prevent full closure of said passageway thereby, whereby to permit direct flow around said valve into said passageway in addition to the flow through said orifice.

10. In a hydraulic shock absorber, a pasageway for the flow of displaced hydraulic fluid, a valve plate in front of said passageway and provided with a metering orifice, said plate being bimetallic whereby to respond to temperature change to flex for closure of said passageway except for said orifice or for exposure of said passageway for direct flow in addition to the flow through said orifice.

11. In a hydraulic shock absorber, a passageway for the flow of displaced hydraulic fluid, a seat surrounding said passageway, a valve plate on said seat extending across said passageway and having a metering orifice in alinement therewith, said plate being inherently thermostatic whereby it will distort in response to temperature change to correspondingly adjust the distance of said orifice from the plane of said seat.

12. In a hydraulic shock absorber, means providing a passage for the flow of displaced hydraulic fluid, a seat surrounding said passage, a valve having a metering orifice therethrough in line with said passage, said valve being thermostatically responsive to engage said seat to prevent flow through said passage except by way of said orifice during a predetermined temperature and to displace itself from said seat upon a decrease in temperature to provide corresponding bleed flow around said valve in addition to the flow through said orifice.

13. In a hydraulic shock absorber, an annular seat structure having a passage therethrough for displaced fluid, said seat structure having an outer seat and an inner seat surrounding said passage, said seats being axially offset, a bimetal valve plate on said seat structure spanning said passage and having an orifice in line therewith, and means limiting the movement of the outer portion of said valve plate relative to said outer seat but leaving said valve plate free to buckle in response to temperature change to adjust said orifice relative to said inner seat.

RALPH F. PEO.